United States Patent
Jeong et al.

(10) Patent No.: US 7,777,824 B2
(45) Date of Patent: Aug. 17, 2010

(54) LIQUID CRYSTAL DISPLAY DEVICE AND REPAIR STRUCTURE WITH ELECTRODE OVERLAPPED TO DATA LINE

(75) Inventors: Woo Nam Jeong, Kyungsnagbuk-do (KR); Ki Tae Kim, Kyungsangbuk-do (KR); Dong Yeung Kwak, Daeku-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/004,104

(22) Filed: Dec. 6, 2004

(65) Prior Publication Data

US 2005/0078234 A1 Apr. 14, 2005

Related U.S. Application Data

(62) Division of application No. 09/642,785, filed on Aug. 22, 2000, now Pat. No. 6,839,096.

(30) Foreign Application Priority Data

Aug. 25, 1999 (KR) .......................... 10-1999-35502

(51) Int. Cl.
G02F 1/1333 (2006.01)
G02F 1/1343 (2006.01)
G02F 1/13 (2006.01)

(52) U.S. Cl. .......................... 349/54; 349/55; 349/192; 349/38; 349/39

(58) Field of Classification Search ............. 349/54–55, 349/192, 38–39
See application file for complete search history.

(56) References Cited

U.S. PATENT DOCUMENTS 5,305,128 A 4/1994 Stupp et al.
5,600,460 A * 2/1997 Yamamoto et al. ............ 349/54
5,880,794 A * 3/1999 Hwang ........................ 349/39
5,920,084 A * 7/1999 Gu et al. ........................ 257/59
5,955,744 A * 9/1999 Gu et al. ........................ 257/59

(Continued)

FOREIGN PATENT DOCUMENTS

JP 10041519 A * 2/1998

*Primary Examiner*—Hoan C Nguyen
(74) *Attorney, Agent, or Firm*—Birch, Stewart, Kolasch & Birch, LLP

(57) ABSTRACT

A liquid crystal display device with a repair structure that facilitates repair of a short circuit or an open circuit. In the device, a gate line is formed on an insulating substrate and a gate electrode is integral to the gate line. A semiconductor layer is formed on the gate electrode with having an insulating film therebetween. A data line is crossed with the gate electrode, and a source electrode is integral to the data line on the semiconductor layer and the gate electrode. A drain electrode is spaced oppositely the source electrode. A protective film has a first contact hole at the drain electrode. A pixel electrode is formed on the protective film and is connected, via the contact hole, to the drain electrode. The pixel electrode has an area overlapped partially with the data line and is spaced from the gate line by a desired length ($\alpha$) at one or more corners thereof. A storage electrode extends from the pixel electrode to be overlapped partially with the gate line and is spaced from the data line by a desired width ($\delta$) at one or more corners thereof.

1 Claim, 12 Drawing Sheets

U.S. PATENT DOCUMENTS

| | | | | |
|---|---|---|---|---|
| 5,995,178 A | * | 11/1999 | Fujikawa et al. | 349/55 |
| 6,038,003 A | * | 3/2000 | Kim | 349/43 |
| 6,040,814 A | | 3/2000 | Murakami et al. | |
| 6,326,641 B1 | * | 12/2001 | Choi | 257/57 |
| 6,424,401 B1 | * | 7/2002 | Kang et al. | 349/153 |
| 6,476,882 B1 | * | 11/2002 | Sakurai | 349/55 |
| 6,633,359 B1 | * | 10/2003 | Zhang et al. | 349/141 |

* cited by examiner

LIQUID CRYSTAL DISPLAY DEVICE AND REPAIR STRUCTURE WITH ELECTRODE OVERLAPPED TO DATA LINE

This application is a Divisional of application Ser. No. 09/642,785, filed on Aug. 22, 2000 now U.S. Pat. No. 6,839,096, and for which priority is claimed under 35 U.S.C. §120; and this application claims priority of Application No. P99-35502 filed in Republic of Korea on Aug. 25, 1999, under 35 U.S.C. §119; the entire contents of all are hereby incorporated by reference.

BACKGROUND OF THE INVENTION

1. Field of the Invention

This invention relates to a liquid crystal display device, and more particularly to a liquid crystal display device that facilitates the repair of defects caused by open or short circuits.

2. Description of the Related Art

Generally, a liquid crystal display (LCD) has a gradually widening range of applications owing to its characteristics such as light weight, a slim profile, low power consumption, etc. Accordingly, the LCD has been used for office automation equipment and video/audio equipment, etc.

Referring to FIG. 1, the conventional LCD includes a source electrode 16 branched from a data line 8 to apply a data signal, and a gate electrode 20 branched from a gate line 14 to apply a scanning signal. The LCD also includes a drain electrode 18 for applying an image signal to a pixel electrode 10. A number of data lines 8 are provided in a vertical direction at a lower glass 2 (shown in FIGS. 2 and 3) to transmit the data signal applied from a data driver (not shown) to each source electrode 16. A number of gate lines 14 are provided in a horizontal direction at the lower glass 2 to be crossed with each data line 8 to transmit a scanning signal applied from a gate driver (not shown) to each gate electrode 20. A scanning signal transmitted from the gate line 14 is applied to the gate electrode 20 to turn on a thin film transistor, thereby transmitting a data signal applied to the source electrode 16 to the drain electrode 18. In other words, the gate electrode 20 switches the data signal in correspondence with the scanning signal. A data signal transmitted to the drain electrode in this manner is applied to the pixel electrode 10, and an orientation of the liquid crystal is changed to correspond with a level of a data signal applied between the pixel electrode 10 and the common voltage layer (not shown).

In this case, since the pixel electrode 10 is a region through which a light beam is transmitted, the larger the pixel electrode area, the higher the aperture ratio of the pixel. Accordingly, as shown in FIG. 1, the pixel electrode 10 is overlapped with the gate line 14 and the data line 8 so as to implement a liquid crystal display device with a high aperture ratio. To this end, an organic protective film with a relatively low dielectric constant of about 2.7 such as Benzocyclobutene (BCB) is used. In this case, since a dielectric constant of the organic protective film is low, it becomes possible to overlap the pixel electrode with the data line. A liquid crystal display device with a high aperture ratio can be implemented by overlapping the pixel electrode with the data electrode in this manner.

A structure of the data line 8 taken along II-II' line in FIG. 1 will be described in conjunction with FIG. 2. As shown in FIG. 2, a gate insulator (GI) 4 is formed on the upper portion of the lower glass 2. At the upper portion of the GI 4, a semiconductor layer 6 and the data line 8 are sequentially provided. A protective film 12 is coated on the data line 8 and the GI4. The pixel electrode 10 is provided at the upper portion of the protective film 12 so as to overlap with the data line 8 at a desired distance.

Further, a structure of the gate line 14 taken along III-III' line in FIG. 1 will be described in conjunction with FIG. 3. As shown in FIG. 3, the gate line 14 is formed selectively at the upper portion of the lower glass 2. The GI 4 is entirely coated on the gate line 14. The protective film 12 is coated on the GI 4. The pixel electrode 10 is provided at the upper portion of the protective film 12 so as to overlap the gate line 14. In order to implement a liquid crystal display device with a high aperture ratio, the gate line 14 and the pixel electrode 10, or the data line 8 and the pixel electrode 10, are overlapped at a desired distance with respect to each other.

In the above-described liquid crystal display device with a high aperture ratio, a distance between the pixel electrodes 10 is narrow enough to generate a short between the adjacent pixel electrodes (e.g., (n,n) and (n+1, n)). Upon generation of the short, a point defect occurs at the corresponding pixels. To cure such a short, a cutting laser is conventionally used. For example, if the (n,n) numbered pixel electrode and the (n+1,n) numbered pixel electrode at the data line 8 is cut along a cutting line 9 (shown in FIG. 1) so as to cut any one of these pixel electrodes when they are shorted together, then the pixel electrode overlapping the gate line 14 must also be cut. In this case, a short circuit is generated between the gate line 14 and the pixel electrode 10 by such cutting. On the other hand, a similar process is performed when the (n,n) numbered pixel electrode and the (n, n+1) numbered pixel electrode at the gate line 14 are shorted, so that a short circuit is generated between the data line 8 and the pixel electrode 10 by such cutting. The conventional liquid crystal display device with a high aperture ratio has a problem in that a successful repair is impossible upon such a short between adjacent pixel electrodes.

FIG. 4 is a plan view of the conventional liquid crystal display device when the data line and the gate line thereof are open. As shown in FIG. 4, an open circuit is generated at the gate line 14 or the data line 8. For example, as shown in FIG. 5, in order to repair an open circuit in the data line 8, the first point P1 and the second point P2 are welded with a separate pattern (or a repairing line) to reform an electric path of the open-circuited data line 8. Similarly, during an open circuit of the gate line 14, an electric path of the open-circuited gate line 14 is reformed in the same manner. As described above, the conventional liquid crystal display device requires a separate pattern or line to repair the open-circuited line. As a result, a new scheme for appropriately repairing an open circuit and a short circuit generated in the liquid crystal display device with a high aperture ratio is required.

SUMMARY OF THE INVENTION

Accordingly, it is an object of the present invention to provide a liquid crystal display device with a repair structure that is capable of appropriately repairing defects caused by the short circuit or the open circuit.

In order to achieve these and other objects of the invention, a liquid crystal display device suitable for repair according to an aspect of the present invention includes a gate line connected to an integrally formed gate electrode; a data line crossing the gate line, and connected to an integrally formed source electrode; a protective film formed on the gate line and on the data line; a pixel electrode formed on the protective film and connected to a drain electrode, a first portion of the pixel electrode overlapping the data line and being laterally spaced a first distance from the gate line; and a storage electrode connected to the pixel electrode and overlapping the gate line.

A liquid crystal display device suitable for repair according to an aspect of the present invention includes a gate line connected to an integrally formed gate electrode; a data line crossing the gate line, and connected to an integrally formed source electrode; a protective film formed on the gate line and on the data line; a pixel electrode formed on the protective film and connected to a drain electrode, a portion of the pixel electrode overlapping the data line; and a storage electrode connected to the pixel electrode and overlapping the gate line, a portion of the storage electrode being laterally spaced a distance from the data line.

A method for repairing a short circuit between two adjacent pixels of a liquid crystal display device, each pixel having a pixel electrode which does not overlap with a conductive line in corners of the pixel electrode, according to another aspect of the present invention includes cutting with a laser along a cutting line between two corners of the pixel electrode in either of the two adjacent pixels.

A method for repairing a break in a conductive line of a liquid crystal display device according to another aspect of the present invention includes welding an overlapping portion of a pixel electrode on one side of the break to the conductive line with a laser; welding the overlapping portion of the pixel electrode on an opposite side of the break to the conductive line with the laser; and cutting the overlapping portion of the pixel electrode with a laser adjacent to the conductive line.

A repaired liquid crystal display device according to another aspect of the present invention includes a conductive line formed on a substrate; a protective film formed on the conductive line; a pixel electrode formed on the protective film; and a portion of the pixel electrode overlapping the conductive line and electrically separated from the pixel electrode by a gap.

BRIEF DESCRIPTION OF THE DRAWINGS

These and other objects of the invention will be apparent from the following detailed description of the embodiments of the present invention with reference to the accompanying drawings, in which like elements in different figures will be labeled with like reference numbers, and in which.

DETAILED DESCRIPTION OF THE PREFERRED EMBODIMENTS

Figure 1:
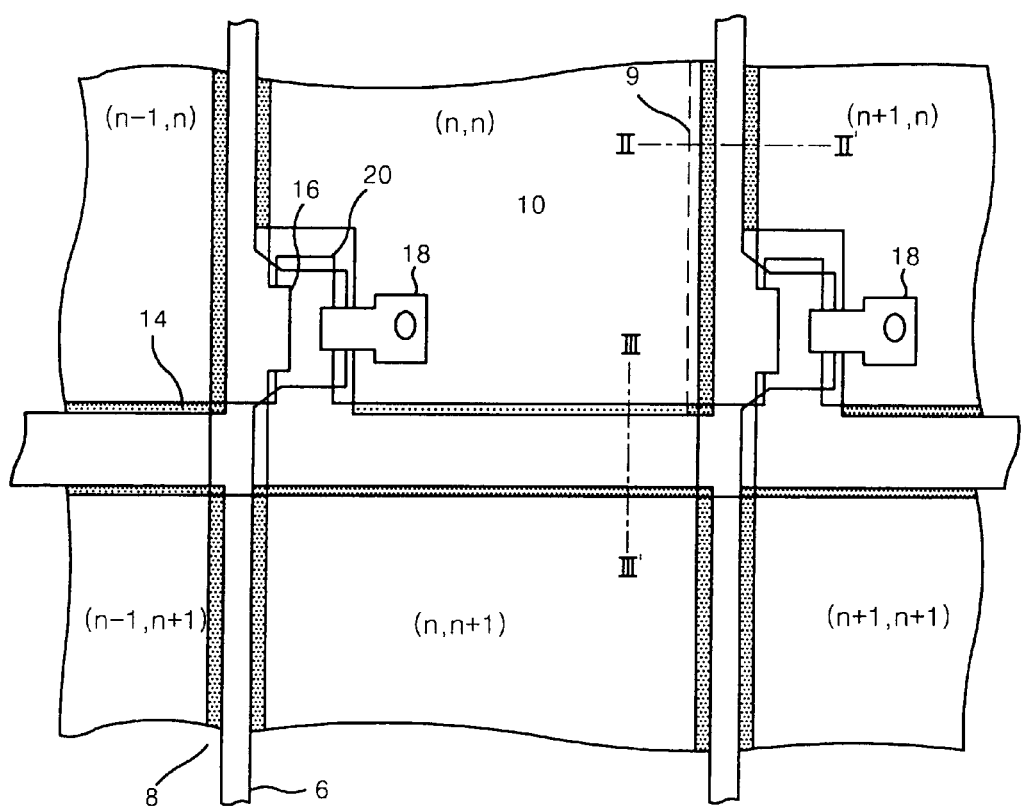
FIG. 1 is a plan view showing the structure of a conventional liquid crystal display device with a high aperture ratio.
Figure 2:
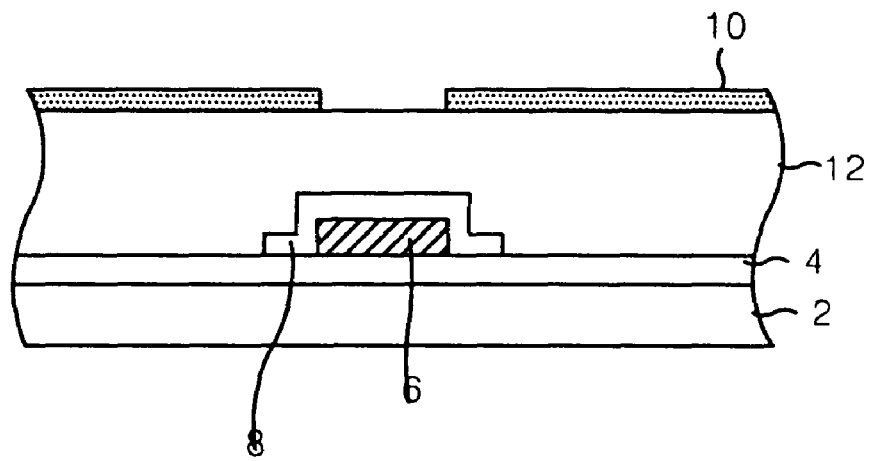
FIG. 2 is a sectional view of the liquid crystal display device taken along II-II' line in FIG. 1.
Figure 3:
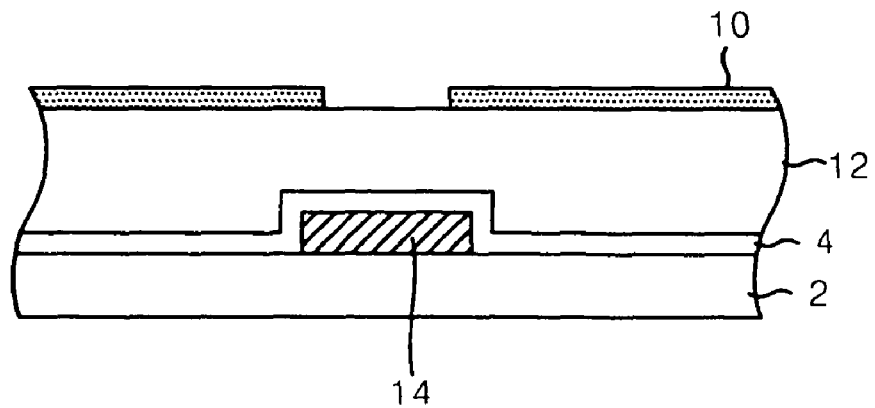
FIG. 3 is a sectional view of the liquid crystal display device taken along III-III' line in FIG. 1.
Figure 4:
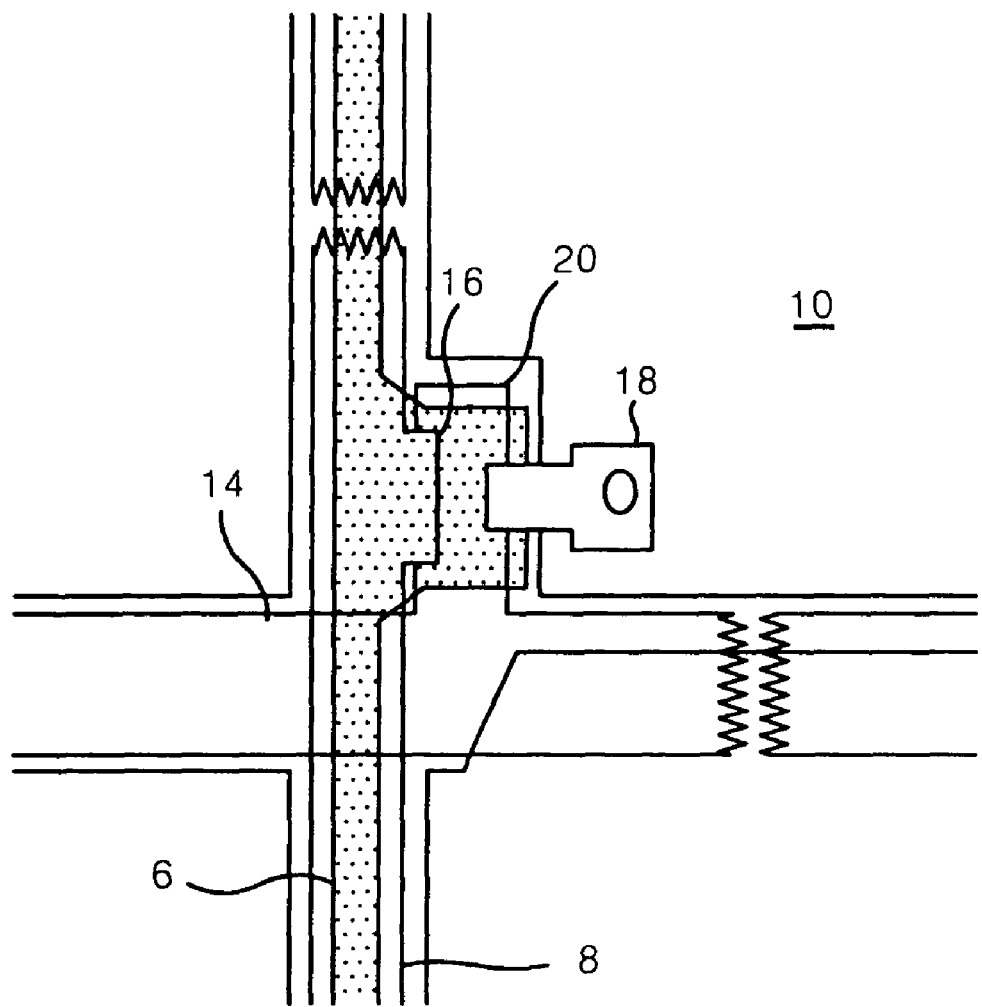
FIG. 4 is a plan view of the conventional liquid crystal display device when the data line and the gate line thereof are shorted.
Figure 5:
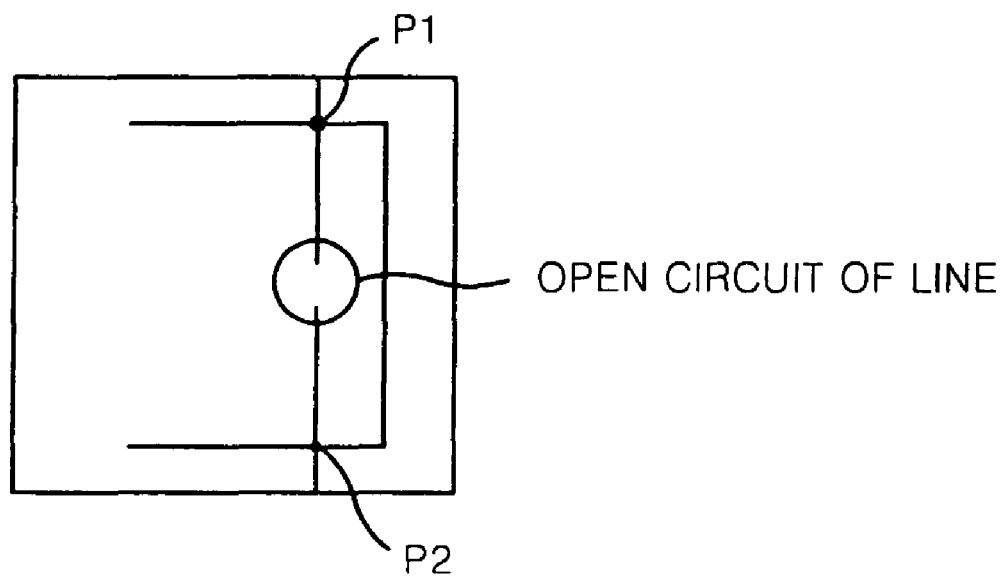
FIG. 5 is a view for explaining a conventional method of repairing an opening in a line.
Figure 6:
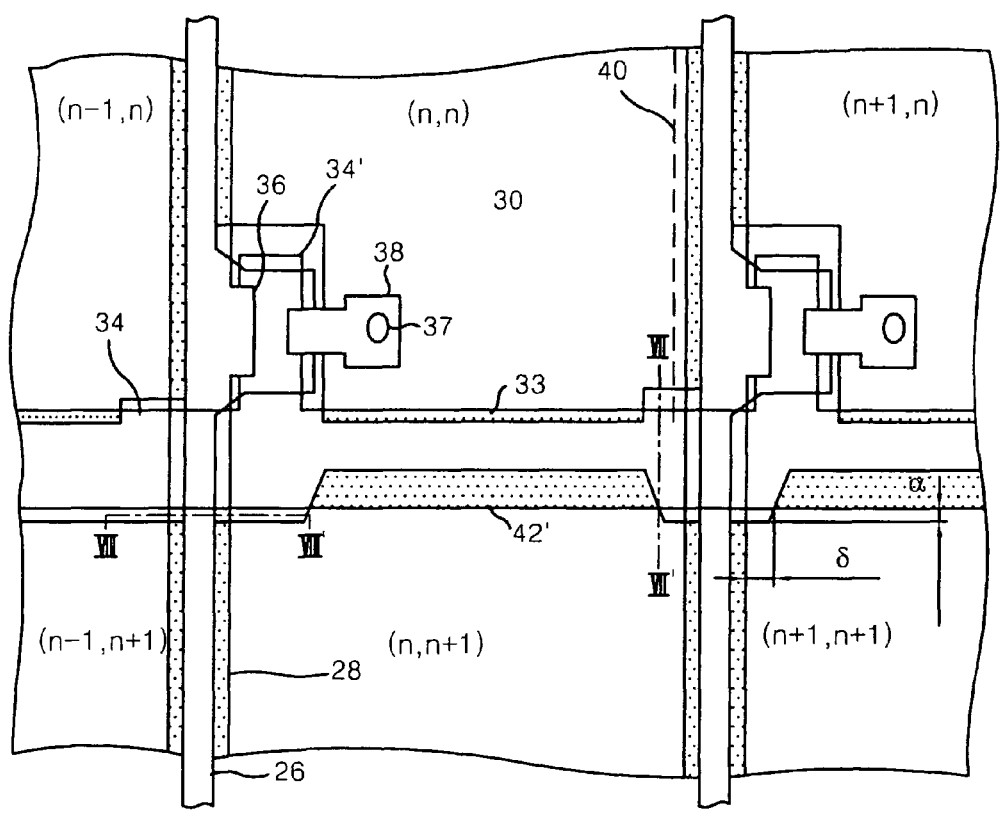
FIG. 6 is a plan view showing the structure of a liquid crystal display device with a repair structure according to a first embodiment of the present invention.
Figure 7:
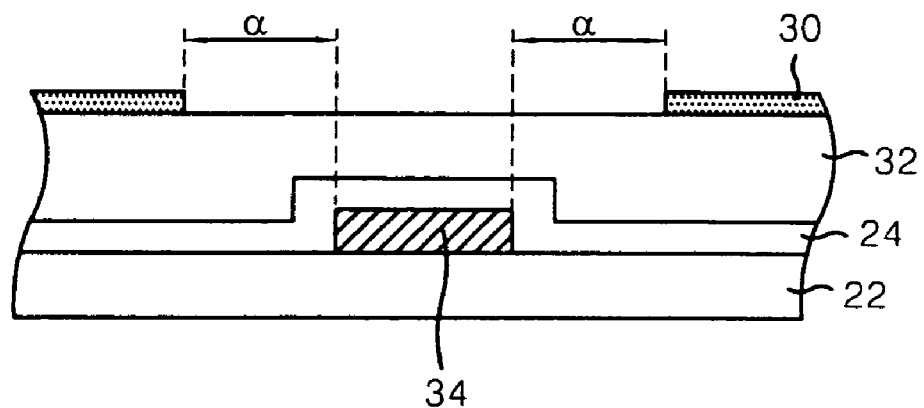
FIG. 7 is a sectional view of the liquid crystal display device taken along VII-VII' line in FIG. 6.

Referring to FIG. 6, there is shown a liquid crystal display device with a repair structure according to a first embodiment of the present invention that includes a pixel electrode formed in such a manner to be spaced with a gate line 34 and a data line 28. As shown in FIG. 7 (taken along line VII-VII' in FIG. 6), in the liquid crystal display device of FIG. 6, the gate line 34 is formed on an lower glass 22 and a gate electrode 34' is integral to the gate line 34. A gate insulator (GI) 24 is provided at the upper portion of the gate line 34. At the upper portion of the GI 24, the data line 28 and a semiconductor layer 26 are formed in such a manner to be crossed with the gate line. A source electrode 36 is formed integral to the data line 28, and a drain electrode 38 is spaced oppositely to the source electrode 36. Subsequently, a protective film 32 having a desired thickness is provided. A first contact hole 37 is defined at a position corresponding to a drain electrode part 38 in the protective film 32. The first contact hole 37 connects the pixel electrode 30 and the drain electrode part 38 electrically.

Meanwhile, an organic protective film is used as the protective film 32, and different types of organic film are as indicated in the following table:

TABLE 1

| Type and Dielectric constant of the organic protective film | |
|---|---|
| Type of Organic Protective Film | Dielectric Constant |
| Polymide added with Fluoropolyarylether | 2.7 |
| Teflon | 1.9-2.1 |
| Cytop | 2.1 |
| BCB (BenzoCycloButene) | 2.7 |
| Fluoropolyarylether | 2.6 |
| Para-Xylene added with Fluoropolyarylether | 2.4 |

As shown in FIG. 6, storage electrode 42', formed of a material identical to the pixel electrode 30, extends from the pixel electrode 30 and overlaps a portion of the gate line 34. The corner of the storage electrode 42' is spaced from the data line 28 by a desired width δ for the purpose of permitting a repair. An aperture ratio of a pixel may be improved by providing a gate line overlapping part 33 at a bottom portion of the pixel electrode 30 which overlaps the gate line 34 as needed. The gate line overlapping part 33 and the storage electrode 42' are spaced by a desired width δ from the data line. The desired width δ means a length permitting a repair of the pixel electrode 30. It is desirable that the length α and the width δ spaced from the pixel electrode 30 are set to correspond with a resolution of the laser performing repair work, so that a short circuit is not generated by the cutting of the laser. For instance, a resolution of the laser used for a repair work is usually about 5 μm.

FIG. 7 is a sectional view showing side corners of the gate line 34 along line VII-VII' in FIG. 6. As shown in FIG. 7, the GI 24 and the protective film 32 are formed at the upper portion of the lower glass 22. In this case, an organic protective film as indicated in Table 1 is used as the protective film 32. The pixel electrode 30 is provided at the upper portion of the protective film 32. The pixel electrode 30 and the gate line 34 are spaced by a desired length α. The desired length α means a distance permitting a repair of the pixel electrode 30 by a laser without generation of a short circuit.

Figure 8:
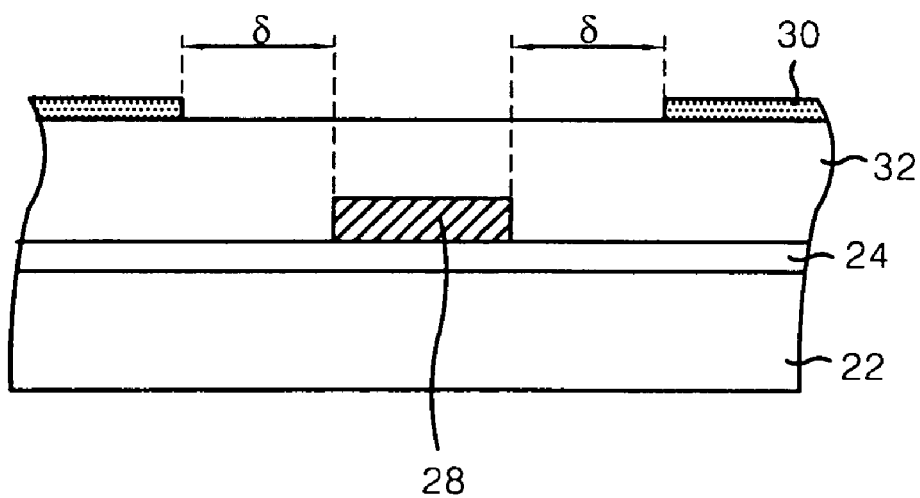
FIG. 8 is a sectional view of the liquid crystal display device taken along VIII-VIII' line in FIG. 6.

FIG. 8 is a sectional view showing side corners of the data line 28 along line VIII-VIII' in FIG. 6. As shown in FIG. 8, the GI 24 and the protective film 32 are formed at the upper portion of the lower glass 22. In this case, an organic protective film as indicated in Table 1 is used as the protective film 32. The pixel electrode 30 is provided at the upper portion of the protective film 32. The pixel electrodes 30 and the data line 28 are spaced by a desired width δ. The desired width δ means a distance permitting a repair of the pixel electrode 30 by a laser without generation of a short circuit.

A method of repairing the (n,n) numbered pixel electrode and the (n+1,n) pixel electrode in FIG. 6 when they are shorted will be described. To this end, any one of the two pixel electrodes is cut with the laser. For instance, the (n,n) numbered pixel electrode is cut along a cutting line 40 with the laser. Thus, the short-circuited (n,n) and (n+1,n) numbered pixel electrodes are electrically isolated from each other. Accordingly, point defects of the short-circuited pixel electrodes 30 can be removed without generation of a short circuit. Also, a repair can be performed by a similar method when the (n,n) numbered pixel electrode and the (n,n+1) numbered pixel electrode are shorted together.

Figure 9:
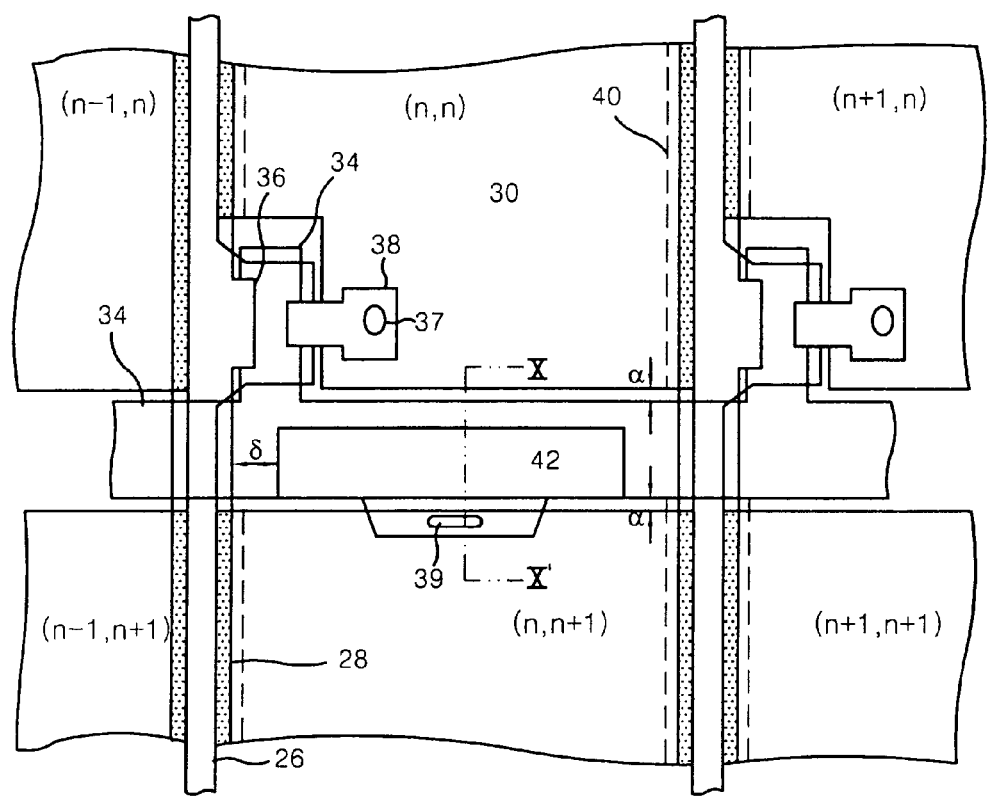
FIG. 9 is a plan view showing the structure of a liquid crystal display device with a repair structure according to a second embodiment of the present invention.

Referring now to FIG. 9, a liquid crystal display device with a repair structure according to a second embodiment of the present invention includes a pixel electrode 30 spaced from a gate line 34. The structure of this second embodiment is similar to that of FIG. 6, so only the differences will be described. The upper and lower portions of the pixel electrode 30 are spaced by a desired length α from the gate line 34 for the purpose of permitting a repair. A storage electrode 42 is formed of a material identical to the pixel electrode 30 and overlaps with the gate line 34. The storage electrode 42 and the pixel electrode 30 are electrically connected via a second contact hole 39. The storage electrode 42 is spaced from the data line 28 by a desired width δ from the data line. At this time, it is desirable that the length α and the width δ spacing the respective gate and data lines from the pixel electrode 30 are set to correspond with a resolution of the laser for avoiding short circuits caused by laser cutting. For instance, a resolution of the laser used for repair work is usually about 5 μm.

Figure 10:
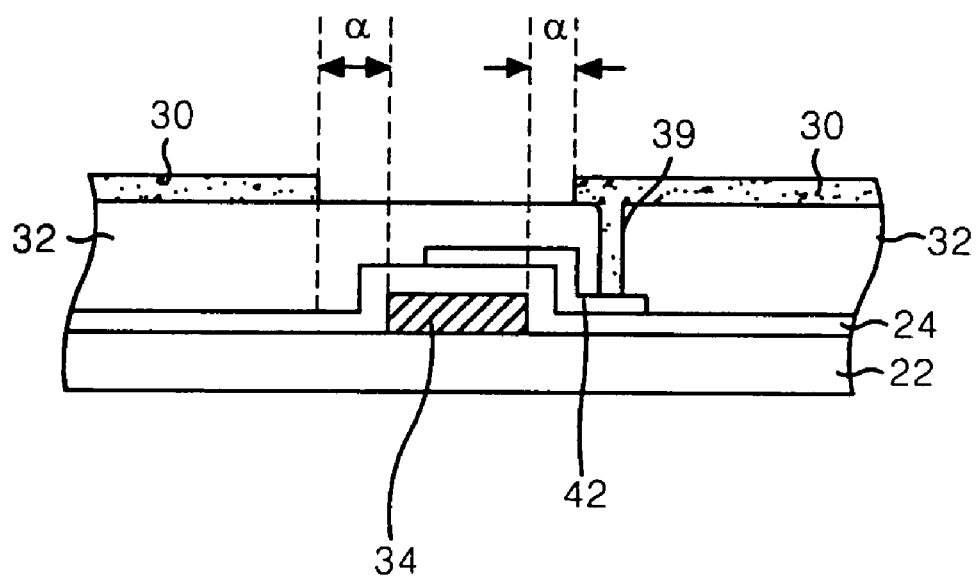
FIG. 10 is a sectional view of the liquid crystal display device taken along X-X' line in FIG. 9.

FIG. 10 is a sectional view of the liquid crystal display device taken along X-X' line in FIG. 9. As shown in FIG. 10, the gate line 34 is formed at the upper portion of the lower glass 22. The storage electrode 42 overlapped with the gate line 34 is electrically connected to the (n,n+1) numbered pixel electrode by the second contact hole 39. In this case, the (n,n) numbered pixel electrode is spaced by a desired distance α from the gate line 34.

An aperture ratio decreases by about 1% in comparison to the liquid crystal display device shown in FIG. 6 by spacing the upper and lower portions of the pixel electrode 30 from the gate line 34 by a desired length α. However, the number of point defects in the pixel electrode connected vertically becomes almost "0" because a distance between the (n,n) numbered pixel electrode and the (n,n+1) numbered pixel electrode is sufficiently wide.

Meanwhile, when the (n,n) numbered pixel electrode and the (n+1,n) pixel electrode in FIG. 9 are shorted together, any one of the two pixel electrodes is cut with a laser so as to repair them. For instance, the (n,n) numbered pixel electrode is cut along a cutting line 40 with the laser. Thus cut, the short-circuited (n,n) and (n+1,n) numbered pixel electrodes are electrically isolated from each other. Accordingly, point defects of the short-circuited pixel electrodes 30 can be removed.

Figure 11:
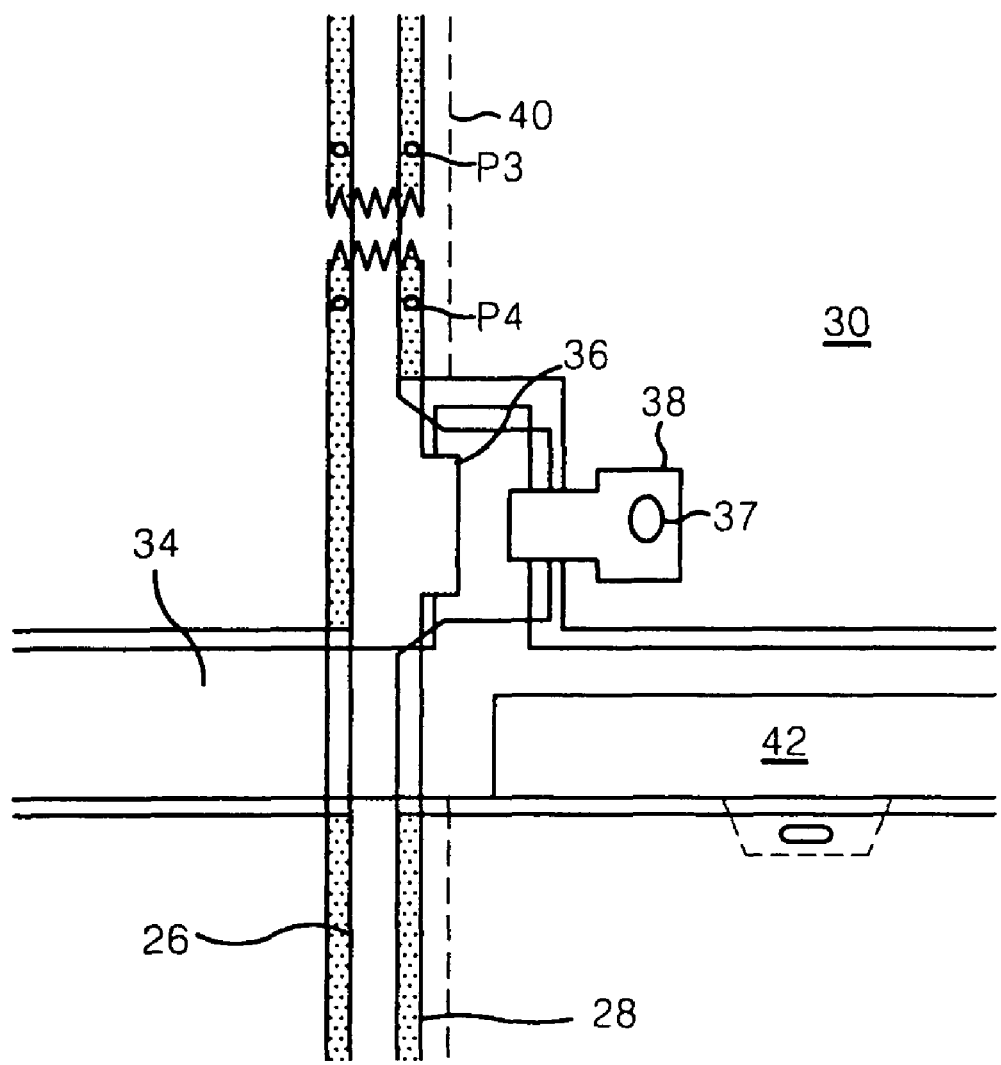
FIG. 11 is a plan view showing the structure of a liquid crystal display device with a repair structure according to a third embodiment of the present invention.

Referring to FIG. 11, a liquid crystal display device with a repair structure according to a third embodiment of the present invention includes a pixel electrode 30 spaced from a gate line 34. The structure of this third embodiment is similar to that of FIG. 9, so only the differences will be described. The upper and lower portions of the pixel electrode 30 are spaced by a desired length α from the gate line 34 for the purpose of permitting a repair. The pixel electrode 30 is overlapped with a data line 28. In this case, a storage electrode 42 is formed in such a manner to be overlapped with a portion of the gate line 34. The storage electrode 42 and the pixel electrode 30 are electrically connected via a contact hole, similar to the structure of FIG. 9.

Figure 12:
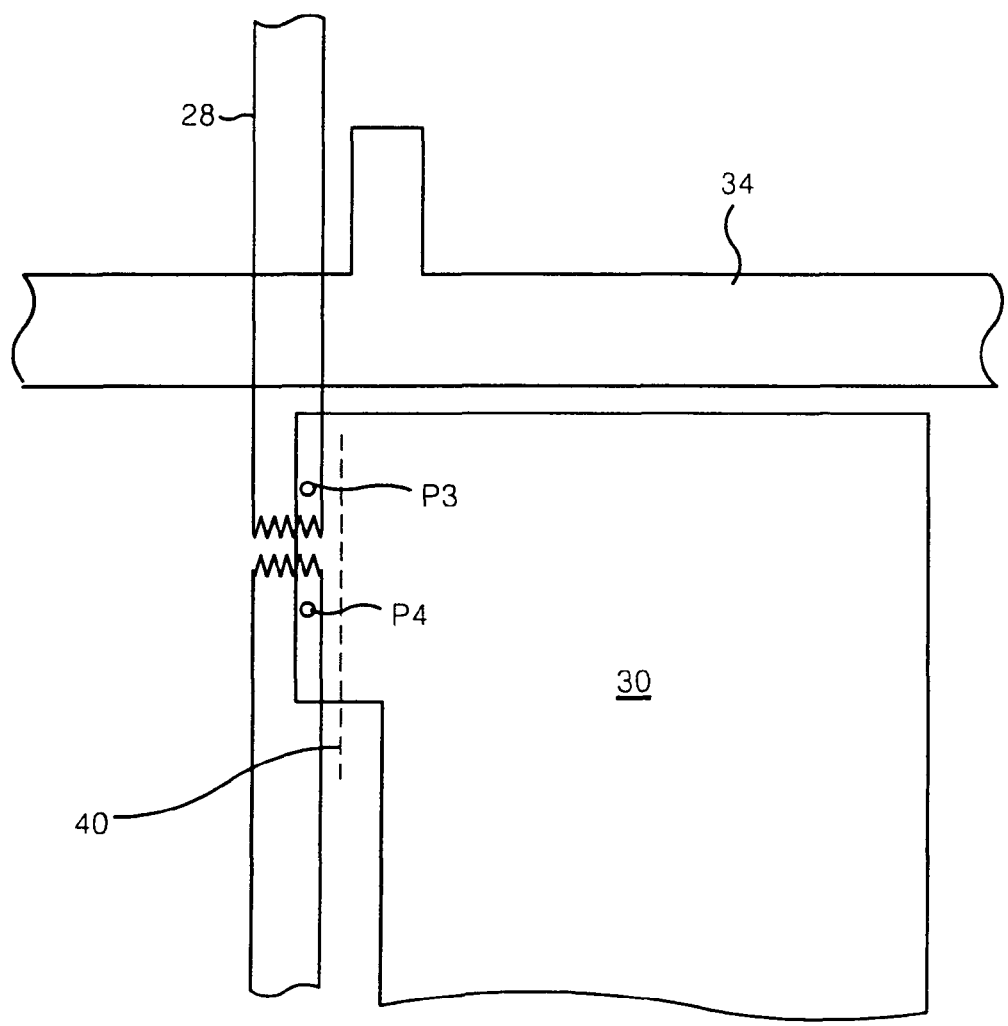
FIG. 12 is a view for explaining a repairing method for the liquid crystal display device according to the third embodiment of the present invention.

A method of repairing the data line 28 in FIG. 11 when it is open-circuited will be described in conjunction with FIG. 12. As shown in FIG. 12, one side point P3 at which one side of open-circuited data line 28 is overlapped with the pixel electrode 30 is welded by a laser, thereby electrically connecting the data line 28 and the pixel electrode 30. The other side point P4 at which other side of open-circuited data line 28 is overlapped with the pixel electrode 30 is welded by a laser, thereby electrically connecting the data line 28 and the pixel electrode 30. Subsequently, the connected points P3 and P4 in the open-circuited data line are electrically isolated from the rest of the pixel electrode 30 by cutting the pixel electrode 30 along a cutting line 40, so that the data line is repaired.

Figure 13:
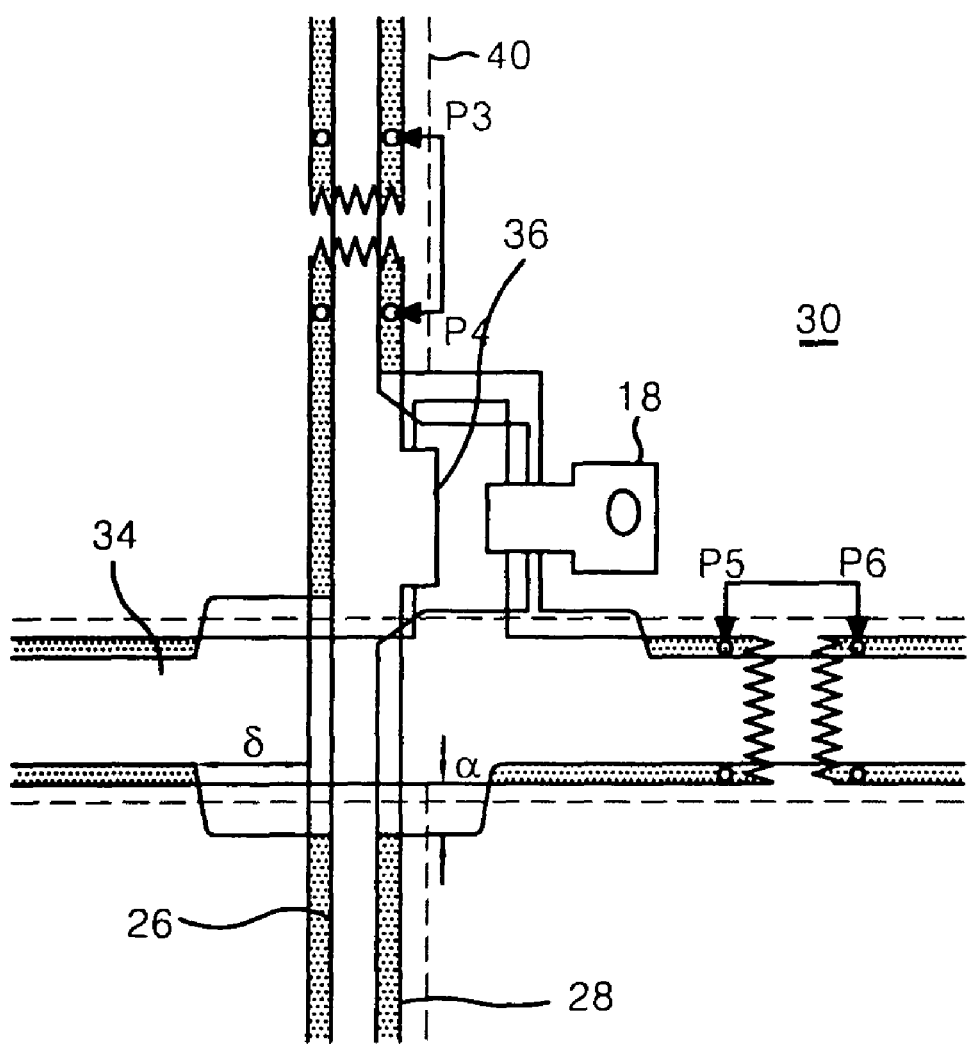
FIG. 13 is a plan view showing the structure of a liquid crystal display device with a repair structure according to a fourth embodiment of the present invention.

Referring to FIG. 13, a liquid crystal display device with a repair structure according to a fourth embodiment of the present invention includes a pixel electrode 30 spaced from a gate line 34 and a data line 28. The structure of this third embodiment is similar to that of FIG. 6, so only the differences will be described. The four corners of the pixel electrode 30 are spaced by a desired length α from the gate line 34 while being space by a desired width δ from the data line 28 for the sake of permitting a repair. The gate line 34, the data line 28 and the pixel electrode 30 are overlapped with each other except for the four corners of the pixel electrode 30.

Figure 14:
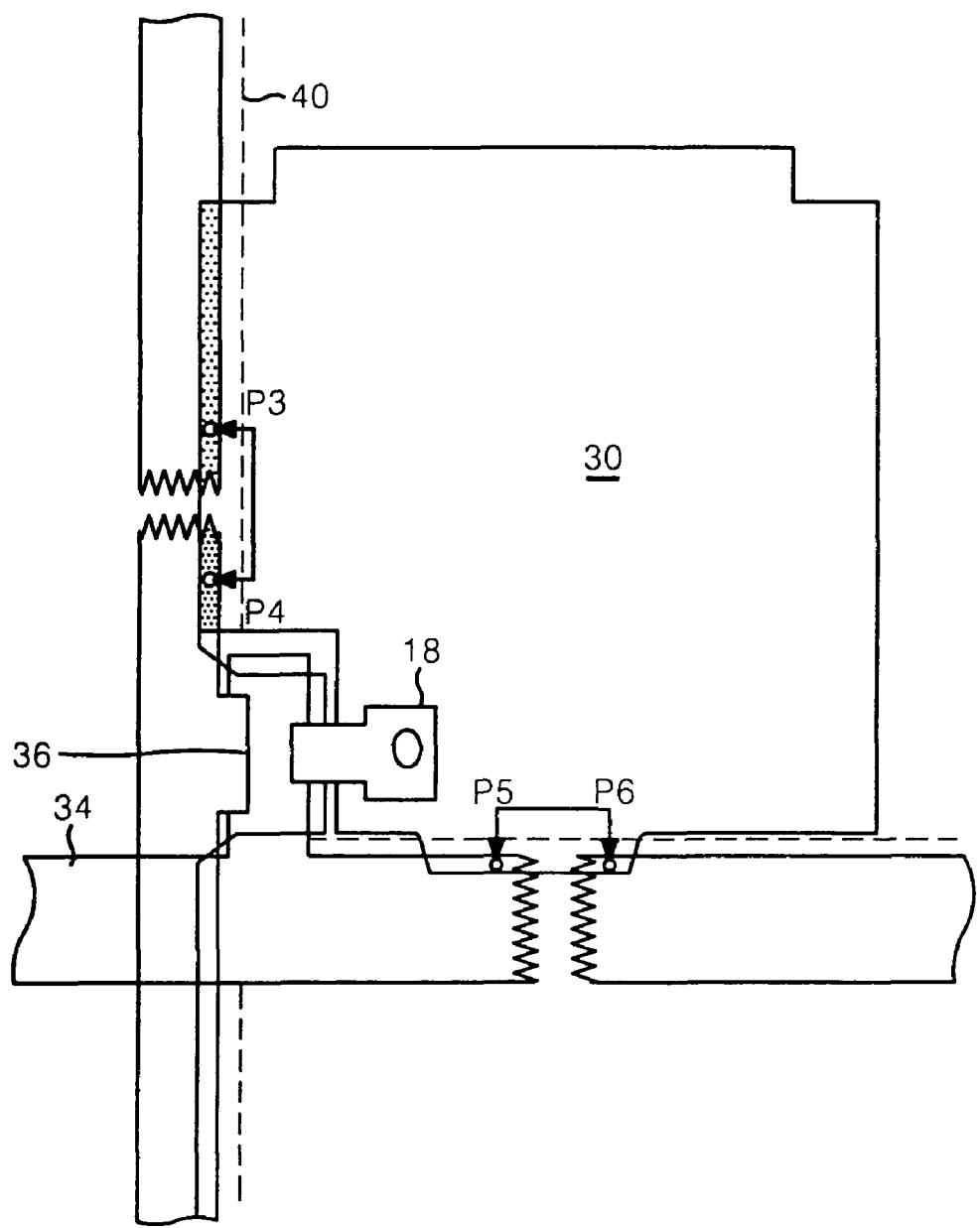
FIG. 14 is a view for explaining a repairing method for the liquid crystal display device according to the fourth embodiment of the present invention.

A method of repairing the data line 28 and the gate lines in FIG. 13 when they are open-circuited will be described in conjunction with FIG. 14. As shown in FIG. 14, one side point P3 at which one side of open-circuited data line 28 is overlapped with the pixel electrode 30 is welded by a laser, thereby electrically connecting one side of the data line 28 and the pixel electrode 30. The other side point P4 at which the other side of open-circuited data line 28 is overlapped with the pixel electrode 30 is welded by a laser, thereby electrically connecting the other side of the data line 28 and the pixel electrode 30. Subsequently, connected points P3 and P4 in the open-circuited data line are electrically isolated from the rest of the pixel electrode 30 by cutting the pixel electrode along a cutting line 40, so that the data line is repaired. In the similar manner, the gate line 34 can be repaired by connecting two points P5 and P6 at the open-circuited gate line 34 electrically by welding and cutting the overlapping portion of the pixel electrode 30.

As described above, the liquid crystal display device with a repair structure according to the present invention has an advantage in that a process yield can be improved by arranging the pixel electrode in correspondence with a short circuit or open circuit of the electrode for the sake of permitting a repair thereof.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A repaired liquid crystal display device, comprising:
  a gate line formed on a substrate;
  a gate insulator on the gate line;
  a data line intersecting the gate line;
  a protective film formed on the data line;
  a pixel electrode formed on the protective film, wherein the pixel electrode is spaced apart from the gate line and overlaps only with the data line; and
  a storage electrode interposed between the gate insulator and the protective film,
  wherein the storage electrode includes an overlapping part overlapping with the gate line and an extending part extending from the overlapping part,
  wherein the extending part overlaps with the pixel electrode, and
  wherein the pixel electrode is in connected with the extending part via a contact hole formed at the protective film.

* * * * *